United States Patent [19]

Föller

[11] 4,356,964
[45] Nov. 2, 1982

[54] THERMIC CONTROL ELEMENT

[75] Inventor: Werner Föller, Stuhr, Fed. Rep. of Germany

[73] Assignee: Gestra-KSB Vertriebsgesellschaft mbH & Co. KG, Bremen, Fed. Rep. of Germany

[21] Appl. No.: 281,589

[22] Filed: Jul. 9, 1981

[30] Foreign Application Priority Data

Jul. 24, 1980 [DE] Fed. Rep. of Germany ....... 3027969

[51] Int. Cl.³ .............................................. F16T 1/10
[52] U.S. Cl. .................................... 236/58; 236/93 A
[58] Field of Search .............. 236/56, 58, 93 A, 99 R, 236/99 J; 73/368.3

[56] References Cited

U.S. PATENT DOCUMENTS

| | | | |
|---|---|---|---|
| 3,366,144 | 1/1968 | Durst | 236/99 R X |
| 3,698,633 | 10/1972 | Lingnau | 236/99 R |
| 4,013,220 | 3/1977 | Zoller | 236/56 |
| 4,161,278 | 2/1979 | Klann et al. | 236/56 |
| 4,248,376 | 2/1981 | Foller | 236/58 |

Primary Examiner—William E. Tapolcai
Attorney, Agent, or Firm—Thomas M. Galgano; Allison C. Collard

[57] ABSTRACT

A thermic control element has a plate-like wall part and a membrane member which is peripherally coupled therewith which, on its one side, supports a locking element and, on its other side, a counter plate facing the wall part. The locking element, the membrane member and the counter plate are rigidly coupled with each other in their central area and the wall part has a cup-shaped curvature with a support face for the outer edge zone of the counter plate. An expansion medium is contained in a receiving chamber formed between the wall part and the membrane member. In the open end position of the locking element, the locking element and the wall part are provided with corresponding cooperating stroke engaging faces and, in the locking element closing position, the axial distance between the stroke engagement faces of the locking element and the wall part is smaller than the axial distance between the support face and the outer edge zone of the counter plate.

4 Claims, 3 Drawing Figures

THERMIC CONTROL ELEMENT

The invention relates to a thermic control element. More particularly, it relates to a thermic control element of the type including a plate-like wall part, a membrane member peripherally coupled to the wall part, a locking element supported on one side of the membrane for a stroke movement between an open and closed end position, and a counter plate supported on the other side of the membrane and facing the wall part, wherein the locking element, the membrane and the counter plate are rigidly coupled together in their central area, wherein the wall part has a cup-shaped curvature with a support face for the outer edge zone of the counter plate and wherein a receiving chamber is defined between the wall part and the membrane member in which an expansion medium is received.

Such thermic control elements (German Patentschrift 20 38 344 and 26 30 038) are used in thermic controlled valves and, in particular, in steam traps. As is known, the closing stroke of the locking element is limited by engaging an associated valve seat in an armature housing, while the opening stroke is limited in that the counter plate, with its outer edge zone which is provided, for example, with deflections in the form of an upright annular collar or a plurality of upwardly-extending support feet, engages a support face of the wall part.

It had been shown that, due to water impacts on the thermic control element, in the known embodiments of such control elements, a bending or deflection, as well as a deformation of the entire counter plate, may occur. This results in such a deformation of the membrane member that the locking element does not reach the valve seat during the locking operation. This results in leakage at the locking location and, therefore, in undesirable steam losses in steam traps.

It is therefore an object of the invention to provide a thermic control element of the aforementioned type which is sufficiently resistant against water impacts.

This object of the invention is obtained by the provision of a thermic control element of the aforementioned type wherein the locking element in its open end position and the wall part are provided with corresponding cooperating stroke engagement faces which are positioned such that in the closed end position of the locking element, the axial distance between the stroke engagement faces of the locking element and the wall part is less than the axial distance between the support face of the wall part and the outer edge of the counter plate.

In the inventive solution to the problem, a direct common support is provided between the massive, deformation-rigid or deformation-resistant locking element and the wall part at high outer pressure, as is the case with water impacts. Since this support, on the one hand, occurs in the center and, on the other hand, the wall part has a high deformation resistancy in the aea of the curvature, a reinforcement of the total receiving chamber for the expansion medium of the control element is achieved and for the parts which, as mentioned before, form the receiving chamber. Furthermore, the distance between the outer edge or the deflection of the counter plates and the associated support face(s) in the curvature of the wall part, as well as the distance between the side of the counter plate facing the locking element and the locking element itself, can be so dimensioned that these distances are bridged during a deforming in the center of the wall part, so that a positive locking is also obtained in the edge zone of the curvature. However, the deformations of the wall part and the counter plate stay within the elasticity limits of the materials used. Tests with such designed control elements have shown that the outer pressure may be increased between two or four times before similar effects are shown as in the commonly known control elements.

Other objects and features of the present invention will become apparent from the following detailed description when taken in connection with the accompanying drawing which discloses several embodiments of the invention. It is to be understood that the drawing is designed for the purpose of illustration only and is not intended as a definition of the limits of the invention.

In the drawing, wherein similar reference characters denote similar elements throughout the several views.

Figure 1:
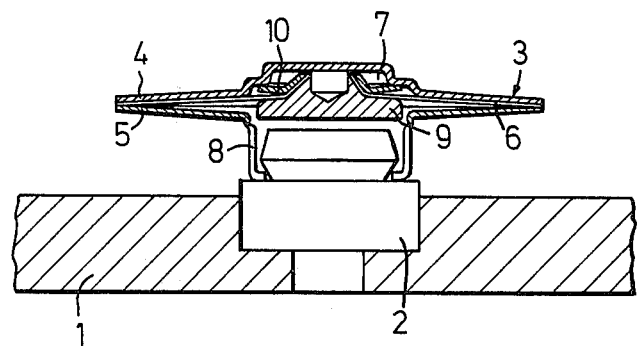
FIG. 1 is a cross-sectional view of a thermic control element embodying the present invention, showing the same in an open position relative to the valve seat.

Referring now in detail to FIG. 1, a valve bushing 2 is inserted in a wall 1 which separates the prepressure and low pressure side in an armature housing (not shown in detail). This bushing supports a thermic or thermal control element 3.

Control element 3 is provided with two plate-like wall parts 4 and 5 and with a membrane member 6 disposed therebetween which, at its outer edge, is rigidly welded to wall parts 4, 5. Thereby, upper wall part 4, together with membrane member 6, forms a receiving chamber 7 for an expansion medium, while lower wall part 5 is provided with pawls 8 for mounting control element 3 on valve bushing 2.

One side of membrane member 6 supports a locking element 9 which cooperates with valve bushing 2 and its other side supports a counter plate 10 disposed in receiving chamber 7. Counter plate 10 and membrane member 6 are both provided with a central bore through which a central axial pin 11 of locking element 9 extends. Locking element 9, membrane member 6 and counter plate 10 are welded together on the free end of axial pin 11. Thereby, membrane member 6 is clamped in the foot area of axial pin 11 between counter plate 10 and locking element 9. Running in an outwardly diverging manner from the foot area are the front faces of locking element 9 and counter plate 10 which face membrane member 6 and serve as a support face for membrane member 6 in the two stroke end positions thereof. Wall parts 4 and 5 also serve as support faces for membrane member 6 in the stroke end positions thereof.

Figure 2:
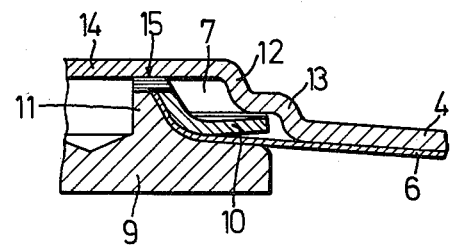
FIG. 2 is a fragmentarily-illustrated sectional view through a portion of the control element shown in FIG. 1.

Upper wall part 4 is provided with a cup-shaped curvature 12 with a step 13 in the outer edge zone thereof (FIG. 2).

The central bottom 14 of curvature 12 and the front face 15 of axial pin 11 with the welding seam are designed as stroke engagement faces. Thereby, locking element 9, counter plate 10 and wall part 4 are so designed that, in the locking position of locking element 9, the axial distance between the outer edge zone of counter plate 10 and step 13 in wall part 4 is a little larger than the axial distance between front face 15 of axial pin 11 and central bottom 14 on wall part 4. Due to this design, locking element 9 with its axial pin 11 engages wall part 4 at the end of the opening stroke.

Locking element 9 with its axial pin 11 may be designed in a deformation resistant manner so that it does not deform when admitted by water impacts. If the water shocks or impacts are so large that wall part 4 is deformed in the center thereof, the distance btween step 13 and counter plate 10, as well as the subsequent distance between locking element 9 and counter plate 10 is bridged, so that an additional support is provided under these extreme loads or stresses. However, the deformation remains within the elasticity limits of the material used for these parts.

Figure 3:
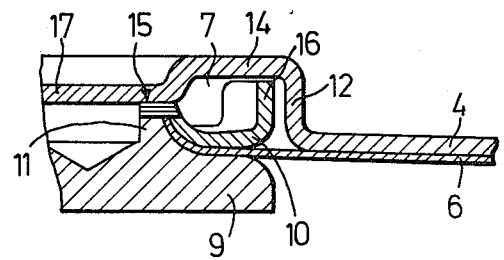
FIG. 3 is a fragmentarily-illustrated sectional view of another embodiment of the control element.

In the structural modification in accordance with FIG. 3, counter plate 10 is deflected at a plurality of places along its circumference so as to form support legs 16 which extend into curvature 12 of wall part 4. Thereby, support legs 16 extend beyond front face 15 of axial pin 11 of locking element 9. Bottom 14 of curvature 12 is provided with a central recess 17. Thereby, locking element 9 with central front face 15 engages recess 17 when reaching the open end position. When the water hammering or impacts are very strong, the succeeding support legs 16 engage bottom 14 in an analogous manner, as previously explained in conjunction with FIG. 2.

Thus, while only several embodiments of the present invention have been shown and described, it will be obvious that many changes and modifications may be made thereunto, without departing from the spirit and scope of the invention.

What is claimed is:

1. In a thermic control element of the type including a plate-like wall part, a membrane member peripherally coupled to said wall part, a locking element supported on one side of the membrane for stroke movement between an open and closed end position and a counter plate supported on the other side of said membrane and facing the wall plate, wherein the locking element, the membrane member and the counter plate are rigidly coupled together in their central area, wherein the wall part has a cup-shaped curvature with a support face for a peripheral zone of the counter plate and wherein a receiving chamber is defined between said wall part and said membrane member in which an expansion medium is received, the improvement comprising:

said locking element in its open end position and said wall part being provided with corresponding cooperating, centrally disposed stroke engagement faces which are positioned such that, in the closed end position of said locking element, the axial distance between said stroke engagement faces of said locking element and said wall part is less than the axial distance between the support faces of the wall part and said peripheral zone of said counter plate so that, under normal operating conditions, only the axial distance between said stroke engagement faces of said locking element and said wall part will be bridged by means of said centrally disposed stroke engagement face of said locking element engaging said stroke engagement face of said wall part in said closed end position thereof and, so that under extreme loads and upon deformation of said wall part, the axial distance between said support face of said wall part and said peripheral zone of said counter plate will also and subsequently be bridged with said peripheral zone of said counter plate engaging said support face of said wall part so that an additional support is provided.

2. The control element according to claim 1, wherein said locking element has a central axial pin which has a front face which serves as a stroke engagement face.

3. The control element according to claim 1 or 2, wherein said cup-shaped curvature of the wall part is provided with a step in its edge zone which forms a support face for said counter plate and a central bottom which serves as said stroke engagement face thereof.

4. The control element according to claim 1 or 2, wherein said counter plate has a deflected portion at its outer edge which projects into and along the curvature of said wall part, and wherein said curvature has a bottom portion provided with a recess which forms an engagement face for said stroke engagement face of said locking element which stroke engagement face is centrally disposed.

* * * * *